United States Patent [19]

Neimann et al.

[11] 3,969,204

[45] July 13, 1976

[54] METHOD FOR SEPARATING GASEOUS MIXTURES OF ISOTOPES

[75] Inventors: Hans-Joachim Neimann; Eberhard Schuster; Arno Kersting, all of Erlangen, Germany

[73] Assignee: Kraftwerk Union Aktiengesellschaft, Mulheim, Germany

[22] Filed: June 9, 1975

[21] Appl. No.: 585,058

[30] Foreign Application Priority Data
June 14, 1974  Germany............................ 2428577

[52] U.S. Cl........................... 204/157.1 R; 250/527; 204/DIG. 11
[51] Int. Cl.².......................... B01J 1/10; B01K 1/00
[58] Field of Search.............. 204/157.1 R, DIG. 11; 250/282, 527, 423 P

[56] References Cited
UNITED STATES PATENTS
3,443,087  5/1969  Robieux et al................ 204/157.1 R Primary Examiner—Howard S. Williams
Attorney, Agent, or Firm—Kenyon & Kenyon Reilly Carr & Chapin

[57] ABSTRACT

Molecules to be separated from a mixture of matter of a chemical component are excited in a manner known per se by narrow-band light sources, and a chemical reaction partner for reacting with these molecules is admixed while supplied with energy by electromagnetic radiation or heating, as an addition required for making chemical reactions possible. The mixture and the partner are physically separated while the mixture is being excited and while the partner is being supplied with the energy, the two then being mixed together to cause the reaction.

2 Claims, 1 Drawing Figure

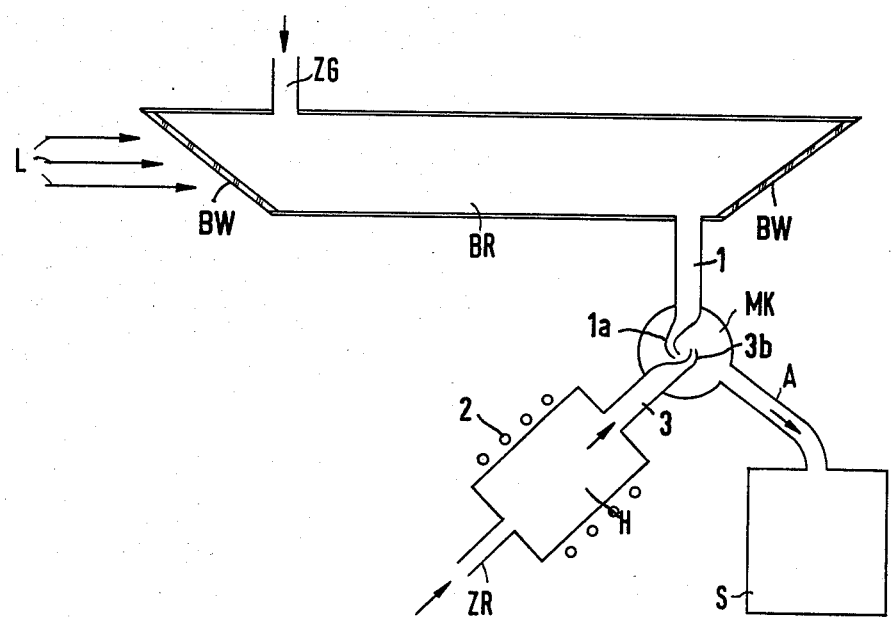

METHOD FOR SEPARATING GASEOUS MIXTURES OF ISOTOPES

BACKGROUND OF THE INVENTION

The present invention concerns a method for chemically separating gaseous mixtures of matter and particularly isotopes, using laser beams to make possible a directed chemical reaction of a mixture component, with a chemical reaction partner.

It is known that molecules which are composed of at least two different elements, absorb electromagnetic radiation in the infrared region. The infrared absorption spectra reflects the structure of the molecules, and are caused by the energy transitions of the rotation-vibrational states. As the vibration energy of a molecule depends greatly on the mass of the participating atoms, molecules which contain one kind of element with different isotopes, also have different spectrascopically detectable absorption lines. This difference in infrared absorption can be used for isotope separation or more generally speaking, for the separation of matter, if the infrared emission line of a laser is brought into resonance with the rotation vibration line of the respective molecule of the kind of atom to be separated, so the molecule is excited thereby. The molecule excited in this manner can then be made to react from its higher energy level thus imparted, with suitable partners. In other words, the absorption of a light quantum by such a molecule constitutes a supply of energy which, with regard to the initiation of certain chemical reactions, has a similar effect as, for instance, an increase in temperature.

In the infrared region the energy which can be supplied by lasers at the present state of their technical development, is relatively small. However, the reaction can be promoted by adding to the chemical partner the additional molecular energy required, such as by the use of a laser beam of appropriate wave length or by heating the partner.

Thus, for the reaction $UF_6 + 2 HCl \rightarrow UF_4 + 2 HF + Cl_2$, a tunable Raman spin-flip laser (RSF laser) which is pumped with a CO laser can be used to excite the $UF_6$. This laser is tuned to one of the absorption bands of the $UF_6$ which lie between 5.2 and 6.4 $\mu$m. The remaining energy required for the reaction partner HCl is added by exciting this molecule at 3.46 $\mu$m by means, for instance, of a tunable laser.

In the above way the isotopes 238 $UF_6$ and 235 $UF_6$ can be separated from a gaseous mixture of the isotopes, the isotope combining with the chemical partner HCl, depending on which of the two is excited by the laser beam which, in turn, depends on the wave length of the beam used.

One way to carry out the reaction has been to enclose the gaseous mixture of isotopes and the gaseous partner together in a reaction chamber having a window at one end through which two laser beams of appropriate wave lengths are radiated so that they pass through the two components to cause their separate excitation as required for the directed reaction desired. When the additional energy required is added to the partner by heating, the partner may be heated outside of the chamber and then introduced to the chamber where the mixture of isotopes is being excited by the laser beam.

In connection with the foregoing, attention is called to the Schuster et al. U.S. Pat. Application Ser. No. 573,071, filed Apr. 30, 1975, where the practice of providing the addition energy required for the reaction, to the partner, is disclosed and claimed.

SUMMARY OF THE INVENTION

In the further development of the method described hereinabove, it is now been found that the desired selective molecular excitation can under some circumstances encounter difficulties if the laser beam intended to excite the isotope of the mixture of isotopes desired for the chemical reaction with the partner, also exerts its influence on the energy state of the reaction partner or its components. This can make it impossible to optimize the desired chemical reaction conditions such as pressure, temperature, etc.

To overcome the above indicated problem, the method of the present invention comprises maintaining the gaseous mixture of isotopes physically separated from the partner during the molecular exciting of each, and prior to loss of their excited states mixing them together to cause the desired reaction. The mixing is preferably effected by swirling the two gaseous components together after their separate excitation required to cause the desired reaction. The mixing may be done in a reaction chamber to which the two excited components are conducted by very short conduits.

Therefore, although the excited states exist for only a short time, a few msec. in the case of infrared excitation, it is still possible to mix the two gaseous components together while they retain their excited energy.

Equipment design suitable for the above are well known from experimental techniques for measuring chemical kinetics, such as, for example, for the measurement of the reaction speed of chemical processes; see, for instance, the book W. I. Moore, De Gruyter Verlag Berlin 1973, pgs. 360 and 361.

BRIEF DESCRIPTION OF THE DRAWING

In an entirely schematic manner, the accompanying drawing shows an example of suitable apparatus of the type referred to above.

DETAILED DESCRIPTION OF THE INVENTION

Having reference to the above, the laser beam L in the form of a traveling or standing wave is radiated through one of the Brewster windows BW closing the opposite ends of an elongated irradiation chamber BR having an input connection ZG for the gaseous mixture of isotopes. At the other end of the reaction chamber a short conduit 1 leads to a cylindrical mixing chamber MK. The chemical partner is introduced through an inlet conduit ZR to a heating chamber H which is, for example, provided with an electric heater 2. The heated reaction partner is fed from the heating chamber H through a short conduit 3 into the mixing chamber MK, the output of reaction products being conducted from the mixing chamber by a line A into a plenum S for collection.

The conduit 1 opens into the mixing chamber MK through a tangential nozzle 1a while the conduit 3 opens into the chamber through a tangential nozzle 3b, the two nozzles being directed in the same directions tangentially with respect to the cylindrical chamber MK. The nozzles eject the gaseous components at relatively high velocity so that the excited gaseous components swirl together and effect a maximized intermixing in a very short time period.

To give a concept of the size of such apparatus, the diameter of the irradiation chamber BR is, for instance, 20 mm. The flow velocity of the gas from this chamber to the mixing chamber MK is, for instance, 50 m per second. If the life of the excited particles is 4 msec, then a length of the connecting line between the irradiation chamber and the mixing chamber of about 20 cm still would be possible. For a life of the particles of 1 msec, one would then obtain a length of 5 cm. Such dimensions, however, are easy to realize design-wise; they can even be made smaller, if necessary.

With this new method, the following advantages are obtained, first of all: The windows BW of the irradiation chamber cannot be attacked by a reaction partner that may be corrosive. Also, precipitated reaction products cannot be deposited on these windows. Furthermore, a disturbance of the excitation by chance light absorption of the reaction partner is avoided. It is also advantageous that the temperature of the irradiation chamber can be adjusted so that coating of the walls and the windows with the mixture of substances to be separated is not possible. However, this adjustability of the temperature also makes it possible to bring about the temperature of the mixture of substances which is optimum for the excitation. Also the other chambers, the mixing chamber MK as well as also the vessel H for heating the reaction partner, can be adjusted separately for optimum temperature values. This means that the excitation and the reaction can be carried out at different temperatures. The excitation in the irradiation chamber BR, for instance, can be carried out at a lower temperature than the reaction in the mixing chamber MK, in order to keep the Doppler width of the spectral lines as small as possible. Undesired chance absorption of laser energy by reaction partners or reaction products is avoided with certainty.

In these examples, the required residual energy was supplied to the reaction partner by supplemental heating. This would be possible, however, also in other ways, as is shown in the previously referred to Schuster et al application, likewise by a laser excitation. The kind of chemical reactions are, of course, also the same as already described in that application. From this it follows that, of course, also further variations in the design of the apparatus required for carrying out such a method are possible. These depend in each case on the chemical reaction provided for the intended separation of the substances.

What is claimed is:

1. A method for chemically separating isotopes from a mixture of gaseous matter formed by mixed isotopes, by a chemical reaction partner, by a reaction directed by a light beam projected through the mixture with the light beam having a narrow band of wave lengths molecularly exciting mainly the isotope to be separated and thereby promoting its reaction with the reaction partner, and molecularly exciting the reaction partner with addition energy to a degree substantially reducing the energy of the laser beam required to promote said reaction in the absence of the addition of the energy to the reaction partner; wherein the improvement comprises maintaining said mixed isotopes and said partner physically separated from each other during the exciting of each, and prior to loss of their excited states mixing them together to cause said reaction.

2. The method of claim 1 in which said mixing is effected by swirling the two together.

* * * * *